United States Patent
Mou

(10) Patent No.: US 12,066,299 B2
(45) Date of Patent: Aug. 20, 2024

(54) METHOD, DEVICE AND SYSTEM FOR PERCEIVING MULTI-SITE ROADBED NETWORK AND TERMINAL

(71) Applicant: SUTENG INNOVATION TECHNOLOGY CO., LTD., Shenzhen (CN)

(72) Inventor: Jiajun Mou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/124,046

(22) Filed: Mar. 21, 2023

(65) Prior Publication Data

US 2023/0228593 A1    Jul. 20, 2023

Related U.S. Application Data

(63) Continuation of application No. PCT/CN2021/105118, filed on Jul. 8, 2021.

(30) Foreign Application Priority Data

Sep. 23, 2020   (CN) .......................... 202011011719.7

(51) Int. Cl.
*G01C 21/00* (2006.01)
*G01C 21/32* (2006.01)

(52) U.S. Cl.
CPC ......... *G01C 21/3841* (2020.08); *G01C 21/32* (2013.01); *G01C 21/3848* (2020.08)

(58) Field of Classification Search
CPC ................ G01C 21/3841; G01C 21/32; G01C 21/3848; H04W 4/021; H04W 4/44;
(Continued)

(56) References Cited

U.S. PATENT DOCUMENTS

| 2018/0146333 A1* | 5/2018 | Lien ........................ H04B 1/48 |
| 2019/0244517 A1* | 8/2019 | Moustafa ............. G08G 1/0112 |

(Continued)

FOREIGN PATENT DOCUMENTS

| CN | 102064847 A | 5/2011 |
| CN | 109739236 A | 5/2019 |

(Continued)

OTHER PUBLICATIONS

First Office Action issued in related Chinese Application No. 202011011719.7, mailed Nov. 10, 2020, 26 pages.

*Primary Examiner* — Nga X Nguyen
(74) *Attorney, Agent, or Firm* — BAYES PLLC

(57) ABSTRACT

A method, a device and a system for perceiving a multi-site roadbed network are provided. The method includes: constructing a global grid map of the roadbed network that is marked with a position of the system for perceiving at least two roadbed base stations and a perceived range of the system; receiving the detected target list transmitted by each of the systems for perceiving at least two roadbed base stations, where the detected target list is the set of the preset detected targets; according to the position of each system for perceiving the roadbed base station, indexing into the global grid map the detected target list transmitted by each system for perceiving the roadbed base station to generate a global tracking list; and tracking the preset detected target in the detected target list transmitted by the system for perceiving the roadbed base station according to the global tracking list.

7 Claims, 9 Drawing Sheets

(58) Field of Classification Search
CPC ........ G06F 16/29; G16Y 20/10; G16Y 20/20; G16Y 40/60
See application file for complete search history.

(56) References Cited

U.S. PATENT DOCUMENTS

| | | | |
|---|---|---|---|
| 2020/0072620 A1* | 3/2020 | Gustafsson | G01C 21/3881 |
| 2021/0004017 A1* | 1/2021 | Colgate | G01C 21/30 |
| 2021/0005331 A1* | 1/2021 | Sawada | G16Y 20/10 |

FOREIGN PATENT DOCUMENTS

| | | | | |
|---|---|---|---|---|
| CN | 110412595 A | * | 11/2019 | G01S 13/06 |
| CN | 110412595 A | | 11/2019 | |
| WO | 2019231524 A1 | | 12/2019 | |

* cited by examiner

METHOD, DEVICE AND SYSTEM FOR PERCEIVING MULTI-SITE ROADBED NETWORK AND TERMINAL

CROSS-REFERENCE TO RELATED APPLICATION

The present application is a continuation of International Application No. PCT/CN2021/105118, filed on Jul. 8, 2021, which claims the benefit of priority to China Patent Application No. CN202011011719.7, filed on Sep. 23, 2020, the contents of which are incorporated herein by reference in their entireties.

TECHNICAL FIELD

An embodiment of the present disclosure relates to the field of sensing technology, and more particularly, to a method, a device, and a system for perceiving a multi-site roadbed network and a terminal.

BACKGROUND

In the field of vehicle-road collaboration, a road traffic network can be comprehensively perceived by building a roadbed network. However, in the traditional roadbed network, each roadbed base station perceives independently. In this case, each roadbed base station needs to be equipped with a set of complete perception solution. Moreover, because perceived results are independent of each other, overlapped areas of adjacent roadbed base stations are repeatedly perceived and do not complement each other. Each independent site can only partially track a target within its respective perceived range.

SUMMARY

One objective of an embodiment of the present disclosure is to provide a method, a device, and a system for perceiving a multi-site roadbed network and a terminal, which can globally track a target.

According to one aspect of the embodiment of the present disclosure, there is provided a method for perceiving a multi-site roadbed network, including:
constructing a global grid map of the roadbed network, where the global grid map is marked with a position and a perceived range of at least two systems for perceiving roadbed base stations;
receiving a detected target list transmitted by each of at least two systems for perceiving roadbed base stations, where the detected target list is a set of preset detected targets;
indexing into the global grid map the detected target list transmitted by each system for perceiving the roadbed base station according to the position of each system for perceiving the roadbed base station to generate a global tracking list; and
tracking the preset detected target in the detected target list transmitted by the system for perceiving the roadbed base station according to the global tracking list.

In some embodiments, the step of tracking the preset detected target in the detected target list transmitted by the system for perceiving the roadbed base station according to the global tracking list includes:
acquiring position information of the system for perceiving the roadbed base station in the global grid map;
according to the position information, indexing a tracked target within a preset range around the system for perceiving the roadbed base station from the global tracking list to form a tracking sub-list corresponding to the system for perceiving the roadbed base station; and
tracking the preset detected target in the detected target list according to the tracking sub-list.

In some embodiments, the step of tracking the preset detected target in the detected target list according to the tracking sub-list further includes:
associating the preset detected target in the detected target list with the tracked target in the tracking sub-list;
if the preset detected target can be associated with the tracked target in the tracking sub-list, acquiring a timestamp of the preset detected target; if the timestamp of the preset detected target is earlier than that of the tracked target associated with the preset detected target, discarding to save information of the preset detected target, and continuing to reserve the tracked target information associated with the preset detected target in the tracking sub-list; and if the timestamp of the detected target is later than the timestamp of the tracked target associated with the detected target, updating the information of the tracked target associated with the preset detected target in the tracking sub-list according to the information of the preset detected target; and
updating the global tracking list according to the updated tracking sub-list.

In some embodiments, the step of associating the preset detected target in the detected target list with the tracked target in the tracking sub-list further includes:
acquiring first information of the tracked target in the tracking sub-list; where the first information of the tracked target includes one of position information, orientation information, and speed information or a combination of at least two of position information, orientation information, and speed information;
acquiring the timestamp of the detected target list, and predicting a second information of each tracked target corresponding to the timestamp of the detected target list according to the first information of each tracked target in the tracking sub-list; where the second information of each tracked target includes one of the position information, orientation information, and speed information or a combination of at least two of position information, orientation information, and speed information;
determining the preset detected target matching each tracked target according to the second information of each tracked target; and
associating the tracked target with the preset detected target matching the tracked target.

In some embodiments, after the step of associating the tracked target with the preset detected target matching the tracked target, the method further includes:
determining whether the preset detected target that is not associated with the tracked target in the tracking sub-list in the preset detected target is provided;
if the preset detected target that is not associated with the tracked target is provided, adding to the tracking sub-list the information of the preset detected target that is not associated with the tracked target, generating a new tracked target, and updating the tracked target information in the tracking sub-list; and
updating the global tracking list according to the updated tracking sub-list.

An embodiment of the present disclosure also provides a device for perceiving a multi-site roadbed network, including:
- a map constructing module, configured to construct a global grid map of the roadbed network, where the global grid map is marked with a position and a perceived range of at least two systems for perceiving roadbed base stations;
- a target list receiving module, configured to receive a detected target list transmitted by each of the systems for perceiving at least two roadbed base stations, where the detected target list is a set of preset detected targets;
- a tracking list forming module, configured to index into the global grid map the detected target list transmitted by each system for perceiving the roadbed base station according to the position of each system for perceiving the roadbed base station to generate a global tracking list; and
- a tracking module, configured to track the preset detected target in the detected target list transmitted by the system for perceiving the roadbed base station according to the global tracking list.

An embodiment of the present disclosure further provides a terminal, including: a processor, a memory, a communication interface, and a communication bus, where the processor, the memory, and the communication interface complete intercommunication via the communication bus.

The memory is configured to store at least one executable instruction. The executable instruction causes the processor to perform the steps of the forgoing method for perceiving the multi-site roadbed network.

An embodiment of the present disclosure also provides a system for perceiving a multi-site roadbed network, including a system for perceiving at least two roadbed base stations and a terminal, wherein, The at least two systems for perceiving roadbed base stations are configured to acquire data, detect a target based on the acquired data, obtain a detected target list, and transmit the detected target list to the terminal, where the detected target list is a set of preset detected targets.

The terminal is configured to construct a global grid map of the roadbed network, where the global grid map is marked with a position of the system for perceiving at least two roadbed base stations and a perceived range of the system; receive the detected target list transmitted by each of the systems for perceiving at least two roadbed base stations, where the detected target list is the set of the preset detected targets; according to the position of each system for perceiving the roadbed base station, index into the global grid map the detected target list transmitted by each system for perceiving the roadbed base station to generate a global tracking list; and track the preset detected target in the detected target list transmitted by the system for perceiving the roadbed base station according to the global tracking list.

In some embodiments, the system for perceiving the roadbed base station includes a sensor and a processor.

The sensor is configured to acquire data and includes an image sensor, a radar sensor, or a combination of the image sensor and the radar sensor.

The processor is configured to detect the target according to the data acquired by the sensor, and store a label of the detected target.

In some embodiments, the terminal includes a storage unit and a calculating unit.

The calculating unit is configured to construct the global grid map of the roadbed network; according to the position of the system for perceiving the roadbed base station and the position of the detected target, index the target list transmitted by each system for perceiving the roadbed base station to the global grid map to form the tracking list containing a plurality of tracked targets; according to the tracking list, track the detected targets in the detected target list transmitted by the system for perceiving the roadbed base station.

The storage unit is configured to store the global grid map and the tracking list.

An embodiment of the present disclosure also provides a method for perceiving a multi-site roadbed network, including the following steps:
- constructing a global grid map of the roadbed network, where the global grid map is marked with a position and a perceived range of at least two adjacent systems for perceiving roadbed base stations, and overlapped areas are provided between perceiving areas of the system for perceiving the adjacent roadbed base stations,
- receiving a detected target list transmitted by each of the at least two adjacent systems for perceiving roadbed base stations, where the detected target list is a set of preset detected targets,
- indexing into the global grid map the detected target list transmitted by the system for perceiving at least two adjacent roadbed base stations;
- determining associated preset detected targets positioned in the overlapped areas;
- integrating associated information of the preset detected target and indexing the associated information into the global grid map to generate a global tracking list; and
- tracking the preset detected target in the detected target list transmitted by the system for perceiving the roadbed base station according to the global tracking list.

In some embodiments, the steps of determining the associated preset detected targets positioned in the overlapped areas include:
- acquiring the preset detected target positioned in the overlapped areas;
- calculating a degree of association of the preset detected target positioned in the overlapped areas; and
- if the degree of the association between the two preset detected targets reaches a preset value, determining that the two preset detected targets are the associated preset detected targets.

In some embodiments, the step of calculating the degree of the association of the preset detected target positioned in the overlapped areas includes:
- if a difference value of two preset detected targets in the overlapped areas in position information of the two preset detected targets in the global grid map is within a preset range, acquiring label information of the two preset detected targets; and
- calculating the degree of the association of the two preset detected targets according to the label information.

In some embodiments, the plurality of label information is included, and the steps of calculating the degree of the association of the two preset detected targets according to the label information include:
- calculating similarity values of the two preset detected targets according to part of the label information or all of the label information, respectively;
- weighting and calculating the degree of the association of the two preset detected targets according to the similarity values.

In some embodiments, the plurality of label information is included, and the steps of calculating the degree of the association of the two preset detected targets according to the label information include:
calculating the similarity values of the two preset detected targets corresponding to each of the label information according to the plurality of label information, respectively; and
calculating the degree of the association of two preset detected targets according to the lowest similarity value.

In some embodiments, a position in which the system for perceiving the roadbed base station is positioned is acquired.

If the system for perceiving the roadbed base station is positioned on a preset road section, the plurality of label information is included.

The step of calculating the degree of the association of the two preset detected targets according to the label information includes:
calculating the similarity values of the two preset detected targets via part of the label information or all of the label information, respectively;
weighting and calculating the degree of the association of the two preset detected targets according to the similarity values;
when the degree of association is greater than a first preset value and less than a second preset value, acquiring the lowest similarity value in the similarity values;
According to whether the lowest similarity value reaches a third preset value, determining the degree of the association of two preset detected targets in the overlapped areas.

In some embodiments, the preset detected target is a detected target that has speed information within a preset time:

The method further includes the following steps of:
acquiring the position in which the system for perceiving the roadbed base station is positioned; and
if the system for perceiving the roadbed base station is positioned on a road section with a heavy traffic, adjusting the preset detected target to be a detected target within a preset range of the system for perceiving the roadbed base station that has the speed information within the preset time.

An embodiment of the present disclosure further provides a terminal, including: a processor, a memory, a communication interface, and a communication bus, where the processor, the memory, and the communication interface complete intercommunication via the communication bus.

The memory is configured to store at least one executable instruction. The executable instruction causes the processor to perform the steps of the forgoing method for perceiving the multi-site roadbed network.

An embodiment of the present disclosure also provides a system for perceiving a multi-site roadbed network, including at least two adjacent systems for perceiving roadbed base stations and a terminal, wherein,
the at least two adjacent systems for perceiving roadbed base stations are configured to acquire data, detect a target based on the acquired data, obtain a detected target list, and transmit the detected target list to the terminal, where the detected target list is a set of preset detected targets.
the terminal is configured to perform the steps according to the forgoing method for perceiving the multi-site roadbed network.

In some embodiments, the system for perceiving the roadbed base station includes a sensor and a processor.

The sensor is configured to acquire data and includes an image sensor, a radar sensor, or a combination of the image sensor and the radar sensor.

The processor is configured to detect the target according to the data acquired by the sensor, and store label information of the detected target.

An embodiment of the present disclosure also provides a non-volatile computer readable storage medium. At least one executable instruction is stored in the storage medium. The executable instruction causes the processor to perform the steps of the forgoing method for perceiving the multi-site roadbed network.

The embodiment of the present disclosure constructs a global grid map of the roadbed network to receive the detected target list transmitted by the at least two systems for perceiving roadbed base stations, index the transmitted detected target list into the global grid map, generates a global tracking list, track the preset detected targets in the detected target list transmitted by the system for perceiving the roadbed base station according to the global tracking list, and realize the global tracking of the target.

The foregoing descriptions are only brief descriptions of the technical solutions in the embodiments of the present disclosure. To understand the technical means in the embodiments of the present disclosure more clearly so that the technical means can be carried out according to the content of the specification. To make the foregoing and other objectives, features, and advantages of the embodiments of the present disclosure more apparent and understandable, implementations of the present disclosure are illustrated particularly below.

BRIEF DESCRIPTION OF DRAWINGS

By reading detailed description of embodiments below, various advantages and benefits become clear to the person skilled in the art. The drawings are only used for the objective of showing the embodiments, and are not considered a limitation to the present disclosure. In addition, throughout the drawings, the same reference signs are configured to represent the same component.

DETAILED DESCRIPTION

The following describes exemplary embodiments of the present disclosure in a more detailed manner with reference to the accompanying drawings. Although the accompanying drawings show the exemplary embodiments of the present disclosure, it should be understood that the present disclosure can be implemented in various forms and should not be limited to the embodiments described herein. On the contrary, these embodiments are provided for a more thorough understanding of the present disclosure and entirely transferring the scope of the present disclosure to a person of ordinary skill in the art.

Figure 1:
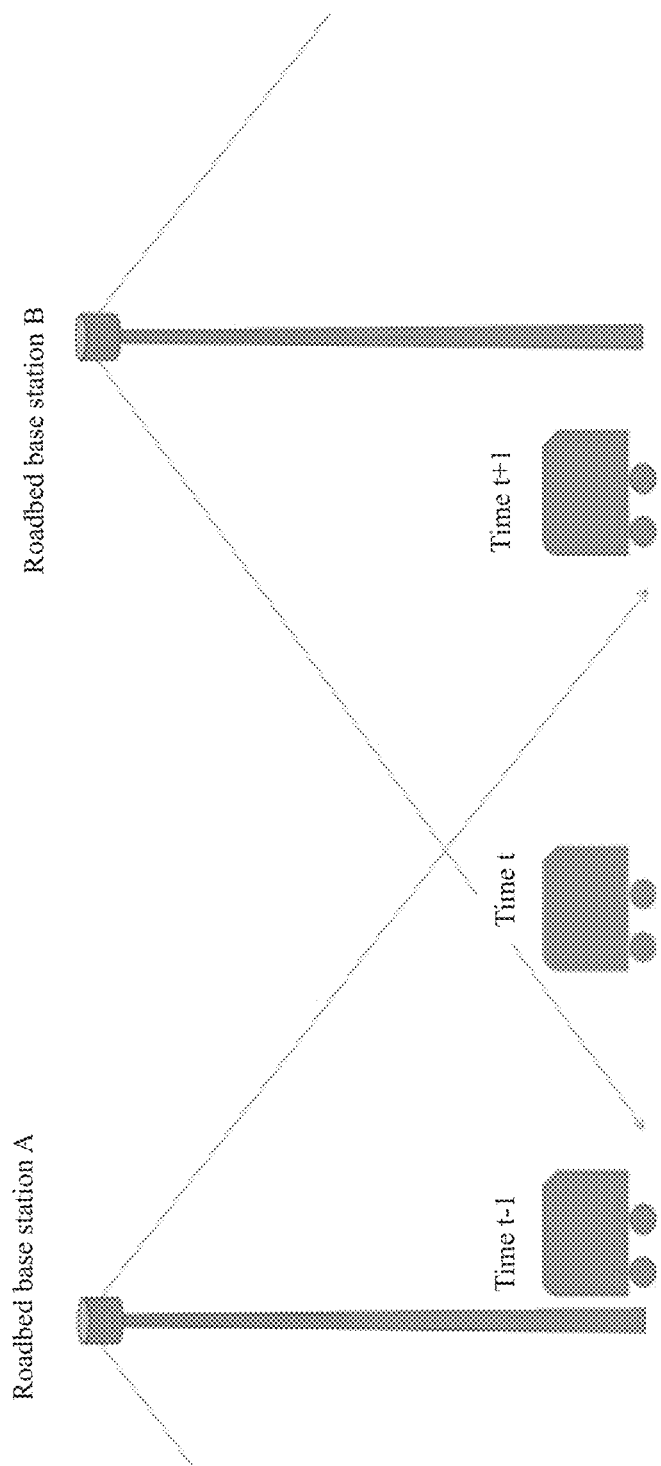
FIG. 1 shows a schematic diagram of perception of the same target by two roadbed base stations in the prior art.

FIG. 1 shows a schematic diagram of the perception of the same target by two roadbed base stations in the prior art. The roadbed base station A and the roadbed base station B are adjacent sites. The roadbed base station A and the roadbed base station B have their perceived ranges and the perceived ranges overlap. A target is a trolley. The trolley enters the perceived range of the roadbed base station A at time (t−1), enters the overlapped perceived ranges of the roadbed base station A and the roadbed base station B at time t, and then enters the perceived range of the roadbed base station B at time (t+1).

The roadbed base station A and the roadbed base station B detect, track and predict a target within their perceived ranges, respectively. For the target trolley, the roadbed base station A can only track the trolley from (t−1) to time t, and cannot track the trolley at time (t+1). However, the roadbed base station B can only track the trolley from time t to time (t+1). The trolley just enters the perceived range of the roadbed base station B at time t. Since the roadbed base station B does not inherit the perceived result of the trolley from the roadbed base station A, the roadbed base station B treats the trolley as a new target entering the perceived range, and re-initializes a tracking state of the trolley, which takes a period of time to track the trolley to have an accurate estimate of the actual state of the trolley, resulting in unrobust tracking results. The roadbed base station A has tracked the trolley for a long period of time from time (t−1) to time t, and has already had a relatively accurate estimate of the trolley. However, after the trolley leaves the perceived range of the roadbed base station A, the perception of the trolley by the roadbed base station A is lost.

Therefore, the traditional roadbed network has the following defects:

The roadbed base station is perceived independently and is not supplemented according to the perceived results of the adjacent sites in the perceived overlapped areas.

The roadbed base station can only track the target within the respective perceived range, and cannot track the target in a global scope. When the target moves from one roadbed base station to another roadbed base station, the perceived result cannot be inherited from the previous roadbed base station. The target can only be perceived again through initialization, and the target can also be repeatedly perceived and tracked in the plurality of roadbed base stations.

The embodiment of the present disclosure provides a global perception method for the defects of independent perception of the traditional roadbed network. This method integrates into the global map the perceived results of a plurality of stations in the roadbed network, and realizes the global tracking of the target via global integration, so as to realize that one target is continuously tracked in the global roadbed network and has a unique tracking ID. In addition, global perception can ensure the complementarity of the perceived results of the site. When the target is far away from the perceived range of the roadbed base station A, the perceived result becomes more uncertain as a distance becomes longer. Further, the target also approaches the roadbed base station B at the same time. Uncertainty of the perceived result in the roadbed base station B is reduced, and perception certainty of the target is improved via the global integration.

Figure 2:
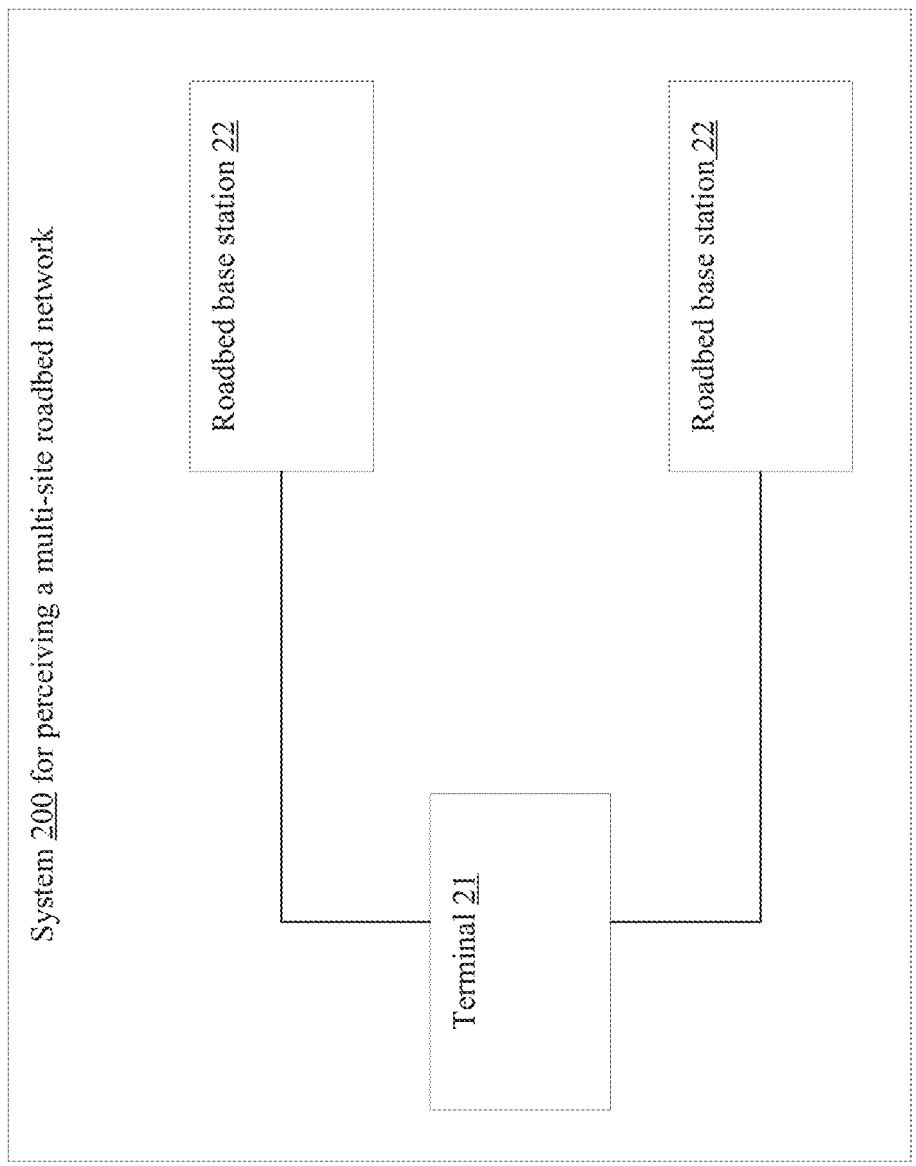
FIG. 2 shows a schematic diagram of a system for perceiving a multi-site roadbed network according to an embodiment of the present disclosure.

FIG. 2 shows a schematic diagram of a system for perceiving a multi-site roadbed network according to an embodiment of the present disclosure. The system 200 includes a terminal 21 and at least two systems 22 for perceiving roadbed base stations. It can be understood that the system for perceiving at least two roadbed base stations 22 includes two or more systems for perceiving the roadbed base stations such as two, three, five, ten, twenty, and one hundred. The number of the systems for perceiving the roadbed base stations is not limited here.

The system 22 for perceiving at least two roadbed base stations is configured to acquire data, detect a target based on the acquired data, obtain a detected target list, and transmit the detected target list to the terminal 21, where the detected target list is a set of preset detected targets.

The terminal 21 is configured to construct a global grid map of the roadbed network, where the global grid map is marked with a position of the a position and a perceived range of at least two systems 200 for perceiving roadbed base stations; receive the detected target list transmitted by each of the systems 22 for perceiving at least two roadbed base stations, where the detected target list is the set of the preset detected targets; according to the position of each system 22 for perceiving the roadbed base station, index into the global grid map the detected target list transmitted by each system 22 for perceiving the roadbed base station to generate a global tracking list; and track the preset detected target in the detected target list transmitted by the system 22 for perceiving the roadbed base station according to the global tracking list.

Figure 3:
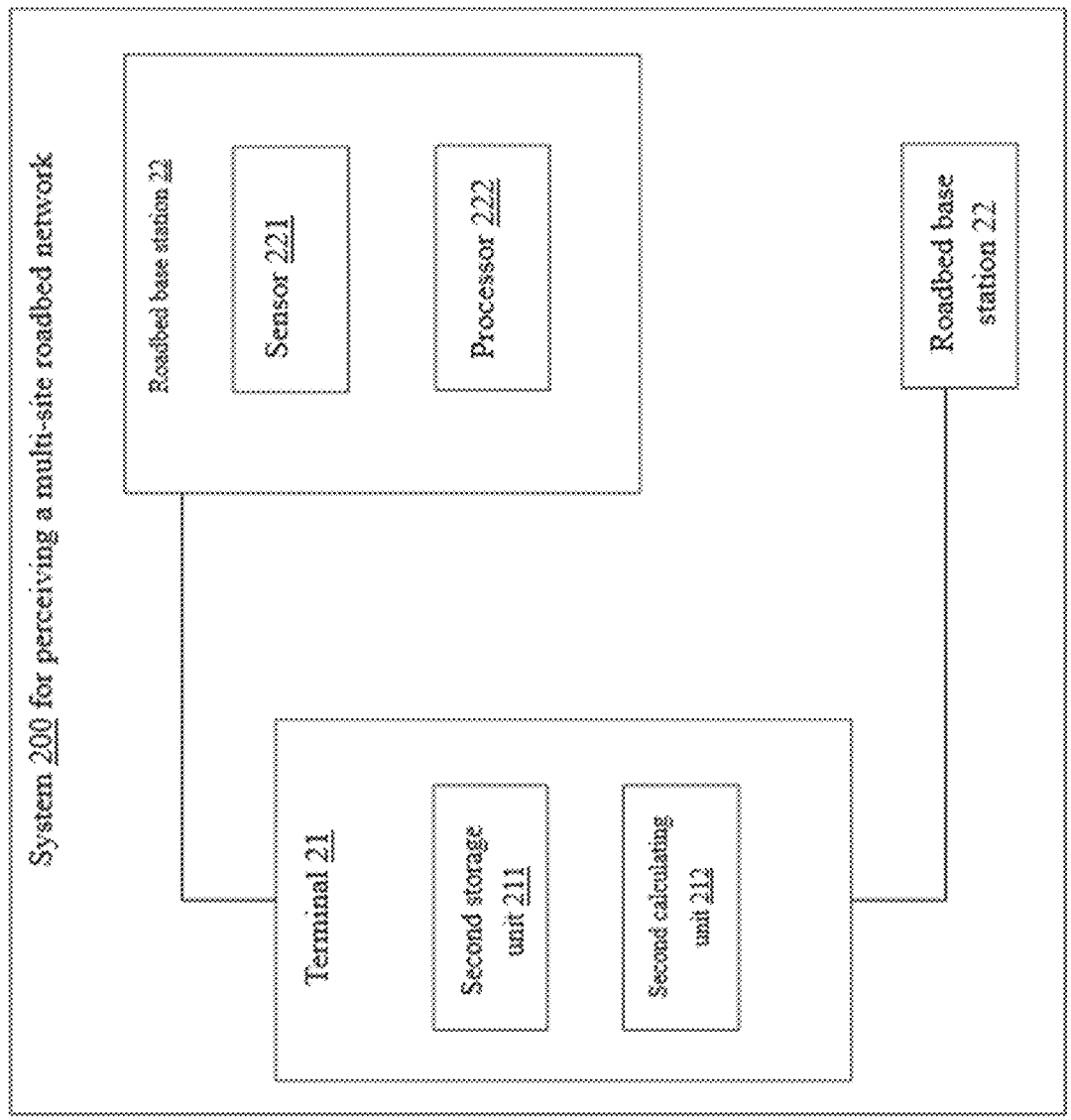
FIG. 3 shows a schematic diagram of a system for perceiving a multi-site roadbed network according to another embodiment of the present disclosure.

In some embodiments, as shown in FIG. 3, the system for perceiving the roadbed base station 22 includes a sensor 221 and a processor 222.

The sensor 221 is configured to acquire the data and includes an image sensor, a radar sensor, or a combination of the image sensor and the radar sensor. The processor 222 is configured to detect a target according to the data acquired by the sensor 221, and store a preset detected target label. The preset detected target label can include, for example, a speed information label, a position information label, a category information label, a shape information label, an orientation label, and the like. It can be understood that when the sensor is a combination of the radar sensor and the image sensor, the label can also include a color label, a semantic label, and the like. The category information label can include a vehicle, a pedestrian, other moving objects, and so on.

It can be understood that the preset detected target is a detected target that has speed information within a preset time. The speed information includes one of angular speed information, linear speed information, angular acceleration information, and acceleration information or a combination of at least two of angular speed information, linear speed information, angular acceleration information, and linear acceleration information.

The processor 222 further includes a first calculating unit, a first storage unit, and a first communication unit, where the first calculating unit is configured to detect the target. The first storage unit is configured to store the preset detected target label. The first communication unit is configured to transmit the detected target list to the terminal 21.

The terminal 21 is a remote terminal and includes a second storage unit 211 and a second calculating unit 212.

The second calculating unit 212 is configured to construct a global grid map of the roadbed network, where the global grid map is marked with a position and a perceived range of at least two system 22 for perceiving roadbed base stations; receive the detected target list transmitted by each of the systems 22 for perceiving at least two roadbed base stations, where the detected target list is the set of the preset detected targets; according to the position of each system 22 for perceiving the roadbed base station, index into the global grid map the detected target list transmitted by each system 22 for perceiving the roadbed base station to generate a global tracking list, and track the preset detected target in the detected target list transmitted by the system for perceiving the roadbed base station according to the global tracking list.

The second storage unit 211 is configured to store the global grid map and the global tracking list.

The terminal 21 further includes a second communication unit configured to receive the detected target list transmitted by the system 22 for perceiving the roadbed base station.

A workflow of the forgoing terminal 21 is described in detail below.

Figure 4:
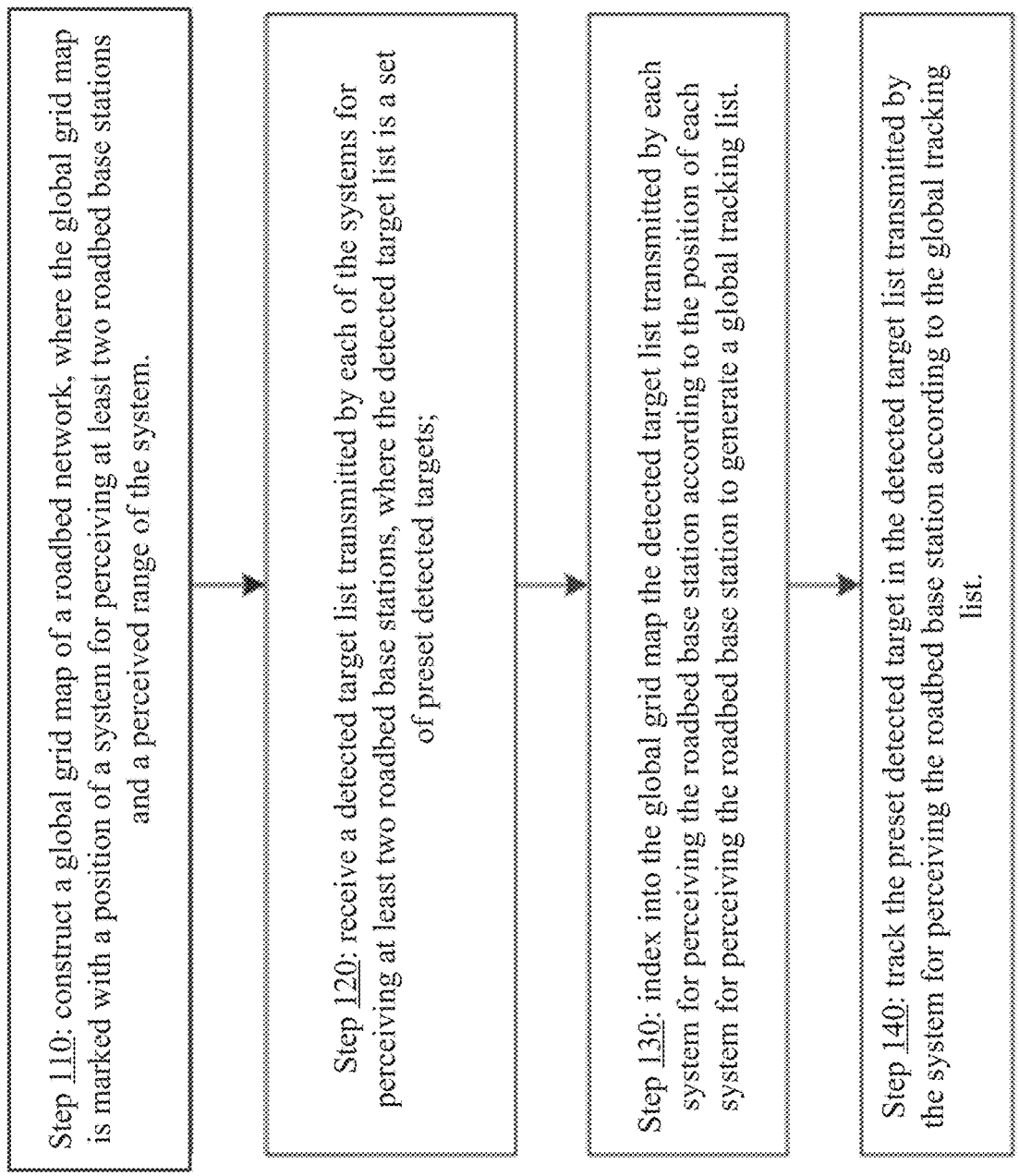
FIG. 4 shows a schematic diagram of a method for perceiving a multi-site roadbed network according to an embodiment of the present disclosure.

FIG. 4 shows a schematic diagram of a method for perceiving a multi-site roadbed network according to an embodiment of the present disclosure. This method is applied to the forgoing terminal 21. As shown in FIG. 4, the method includes the following steps:

Step 110: constructing a global grid map of the roadbed network, where the global grid map is marked with a position of a system for perceiving at least two roadbed base stations and a perceived range of the system.

Figure 5B:
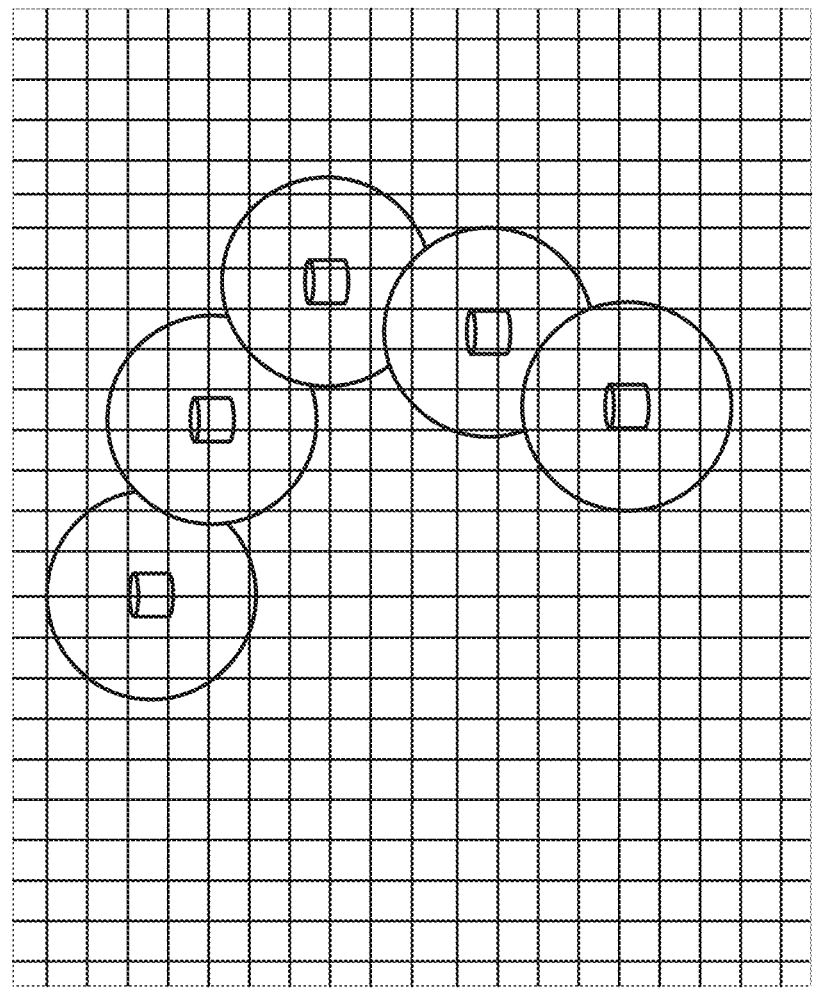
FIGS. 5a-5b show a schematic diagram of an actual roadbed base station network and a global grid map.
Figure 5A:
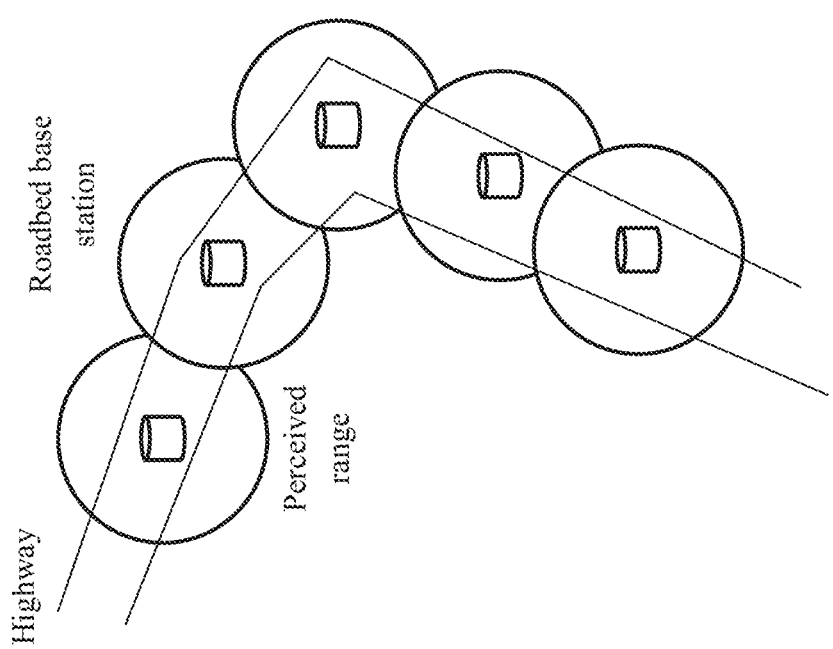

In this step, constructing the global grid map for the roadbed network. The grid map divides an environment of the roadbed network into a series of grids, where each grid is given a possible value, which represents a probability that the grid is occupied. Since a position of the roadbed base station is fixed, a position and a perceived range of each system for perceiving the roadbed base station can also be marked and displayed in the global grid map. FIG. 5a is a schematic diagram of the actual roadbed base station network, and FIG. 5b is a schematic diagram of the roadbed base station network displayed on the global grid map in the same proportion.

Step 120: receiving a detected target list transmitted by each of the at least two systems for perceiving roadbed base stations, where the detected target list is a set of preset detected targets.

In addition to a sensor for perception (including but not limited to an image sensor, a radar sensor, or a combination of the image sensor and the radar sensor), each system for perceiving the roadbed base station is also equipped with a processor for processing received data output by the sensor to get perceived results. It can be understood that each system for perceiving the roadbed base station collects perceived data, detects a target in the processor separately, obtains a detected target list containing a preset detected target label, and transmits the detected target list to the terminal.

When the system for perceiving the roadbed base station detects the target, within a certain range centered on the system for perceiving the roadbed base station, all foreground targets (such as a vehicle, a pedestrian, and other moving targets and other objects of interest) can be detected, and the label information of these targets can be calculated via a point cloud and/or an image.

It can be understood that the processor can apply a traditional geometric algorithm or a machine learning algorithm to identify the perceived data transmitted by the sensor, and obtain the label information of the detected target. The detected target label can include, for example, a speed information label, a position information label, a category information label, a shape information label, an orientation label, a color label, a semantic label or the like.

It can be understood that the processor is further configured to acquire a preset detected target according to identified results to generate the detected target list. The preset detected target can be, for example, an object with a speed information label within a preset time, where the speed information can include one or a combination of angular speed information, linear speed information, angular acceleration information, and linear acceleration information.

It can be understood that the type or set information of the preset detected target can be pre-stored in a memory by the system for perceiving the roadbed base station. For example, the system for perceiving the roadbed base station can preset the preset detected target as an object with speed information; or the system for perceiving the roadbed base station can also set the preset detected target to be an object with the speed information within a preset time; or the system for perceiving the roadbed base station can also set the preset detected target to be an object with the speed information within the preset range of the system for perceiving the roadbed base station. A type of the preset detected target is not uniquely limited here. It can be understood that the system for perceiving the roadbed base station can adjust the type of the preset detected target according to set requirements. Further, the terminal can also adjust a type or set information of the preset detected target according to a position where the system for perceiving the roadbed base station is positioned. For example, when the system for perceiving the roadbed base station is in a road section with heavy traffic, the terminal can adjust the preset detected target to be an object with the speed information within the preset range of the system for perceiving the roadbed base station. Owing to arrangement, flexibility of setting the tracked target can be ensured, and accuracy of a tracking structure can be ensured.

The system for perceiving the roadbed base station can use a box or other forms to mark label information of the preset detected target, and the form to mark label information of the preset detected target is not limited here.

A detecting algorithm of the detected target of the system for perceiving the roadbed base station can use various machine learning algorithms, which are not limited, such as neural network algorithm. When the roadbed base station uses the neural network algorithm to detect the detected target, the following steps are included:

1. Training a Model
    1) collecting data: collecting data of various scenarios that can be encountered when the system for perceiving the roadbed base station performs a detecting task;
    2) marking data: for the collected data, manual marking is used, that is, the target of interest in the collected data is marked with the box;
    3) training the model: inputting the collected data and the marking box into the model, and training a target detecting model.
2. Evaluation
    inputting data similar to the scenario into the trained target detecting model, where the target detecting model outputs the detected marking box, and acquire a difference between the marking box output by an evaluating model and the marking box during manual marking. When the difference is small enough, it can be considered that the model training is completed, and the target detecting model is acquired.

3. Use using the target detecting model evaluated in step 2 in the system for perceiving the roadbed base station.

Step 130: indexing into the global grid map the detected target list transmitted by each system for perceiving the roadbed base station according to the position of each system for perceiving the roadbed base station to generate a global tracking list.

In this step, a terminal side receives the detected results of each system for perceiving the roadbed base station to form one global tracking list. A series of tracking information is provided in the global tracking list. For example, the tracking information at time t includes the tracking information of the tracked target at a plurality of times before time t. It can be understood that the terminal can set a duration of the reserved tracking information according to requirements. For example, the terminal can reserve all tracking information or can also save the tracking information within a preset time according to a motion trajectory of the tracked object. It can be understood that the preset time can be, for example, within five minutes, ten minutes, etc., and the preset duration is not limited here. Owing to arrangement of a storage duration of the tracking information, resources can be saved. In some embodiments, the terminal can adjust the storage duration of the tracking information of the targets in different scenarios and different road sections according to different scenarios and different road sections. For example, when a driving trajectory of the detected target is predicted to enter an intersection or a road section near a school, the storage duration of the tracking information can be increased, so as to ensure accuracy of trajectory prediction of the detected target on a corresponding complex road section, thereby improving certainty of perceiving the target.

It can be understood that in some embodiments, the perceiving areas of the system for perceiving the adjacent roadbed base stations are overlapped. When the detected target list transmitted by the system for perceiving the adjacent roadbed base stations is indexed to the global grid map, the preset detected targets in the overlapped areas are acquired. A degree of association of the preset targets in the overlapped areas is calculated. When the degree of the association of the preset detected targets in the overlapped areas in the detected target list transmitted by the system for perceiving the adjacent roadbed base stations reaches a preset value, the information of associated preset detected target is integrated and indexed into the global grid map to generate the global tracking list.

The step of calculating the degree of the association of the preset targets in the overlapped areas includes: when a difference value in position information of the two preset detected targets in the overlapped areas in the global grid map is within a preset range, that is, when position information of the preset detected targets in the overlapped areas is similar, the label information of the two preset detected targets is acquired, and the degree of the association of the two preset detected targets is calculated according to the part of the label information or all the label information. For example, the speed label information, the category label information, and the orientation label information can be selected to calculate a similarity value of the preset detected targets, respectively. The degree of the association of the two preset detected targets can be weighted and calculated according to the similarity value.

In some embodiments, the degree of the association of the preset targets in the overlapped areas can be determined according to whether the similarity value of the label information with the lowest similarity in the plurality of label information reaches a preset value. In other embodiments, when the sensor includes the image sensor or the image sensor and LiDAR, the degree of the association of the preset targets in the overlapped areas can also be determined according to the similarity between the color label and the semantic label.

It can be understood that the degree of the association of the preset targets in the overlapped areas of the roadbed base station can be calculated with one of the forgoing methods or a combination of the forgoing different association degree calculating methods according to an area where the roadbed base station is positioned. For example, when the area where the roadbed base station is positioned is at the intersection or the road section near the school, for the calculation of the degree of the association of the preset detected targets in the overlapped areas of the roadbed base station, for example, the speed label information, the category label information, and the orientation label information can be selected respectively to calculate the similarity value of the preset detected targets. The degree of the association of the two preset detected targets is weighted and calculated according to the similarity value. When a value of the degree of the association is greater than a first preset value and less than a second preset value, according to whether the similarity value of the label information with the lowest similarity value in the plurality of label information of the preset targets in the overlapped areas reaches a third preset value, the degree of association of the preset targets in the overlapped areas is determined.

It can be understood that, during a process of the preset detected target moving from the roadbed base station A to the roadbed base station B, the preset detected target gradually moves away from the roadbed base station A and approaches the roadbed base station B. If the preset detected targets of the roadbed base station A and the roadbed base station B are detected and determined, respectively, accuracy of the determination of the preset detected targets that can be obtained is reduced. With the global tracking method of the present application, when the tracked target is positioned in an area where the perceived ranges of the roadbed base station A and the roadbed base station B are overlapped, the terminal can associate the detected results received from and transmitted by the roadbed base station A and the roadbed base station B. When the preset detected targets are successfully associated, the information of the associated preset detected targets of the roadbed base station A and the roadbed base station B filters noise with a filter (such as Kalman filter), and then is integrated, and is indexed to the global grid map to generate the global tracking list. With this method, accuracy of detecting each preset detected target at a boundary of each roadbed base station can be ensured, and integrity of information of the tracked target on the global grid map can be ensured. By applying different association methods in different areas or scenarios, accuracy of preset detected targets can be improved on a special road section, thereby ensuring accuracy of preset detected targets at the special road section such as the intersection, the school and the like.

The target is detected by the single system for perceiving the roadbed base station, and global tracking is completed in the terminal. Since the detected target list of each system for perceiving the roadbed base station is indexed to the global grid map, the global tracking list formed in this step includes the detected results of each system for perceiving the roadbed base station. In an ultra-large range formed by all base stations, the tracked target is tracked continuously, not only in the single roadbed base station. When the tracked target moves between the roadbed base stations, the tracking is not discontinued, and there is no need to re-track the tracked target in a new roadbed base station. With this global tracking method, it is possible that one target has only one tracked ID in the roadbed perceiving network and is continuously tracked in the roadbed perceiving network. For example, if a certain tracked target is continuously tracked from the roadbed base station A to the roadbed base station B, the tracked results are also inherited from the roadbed base station A to the roadbed base station B.

Step 140: tracking the preset detected target in the detected target list transmitted by the system for perceiving the roadbed base station according to the global tracking list.

Figure 6:
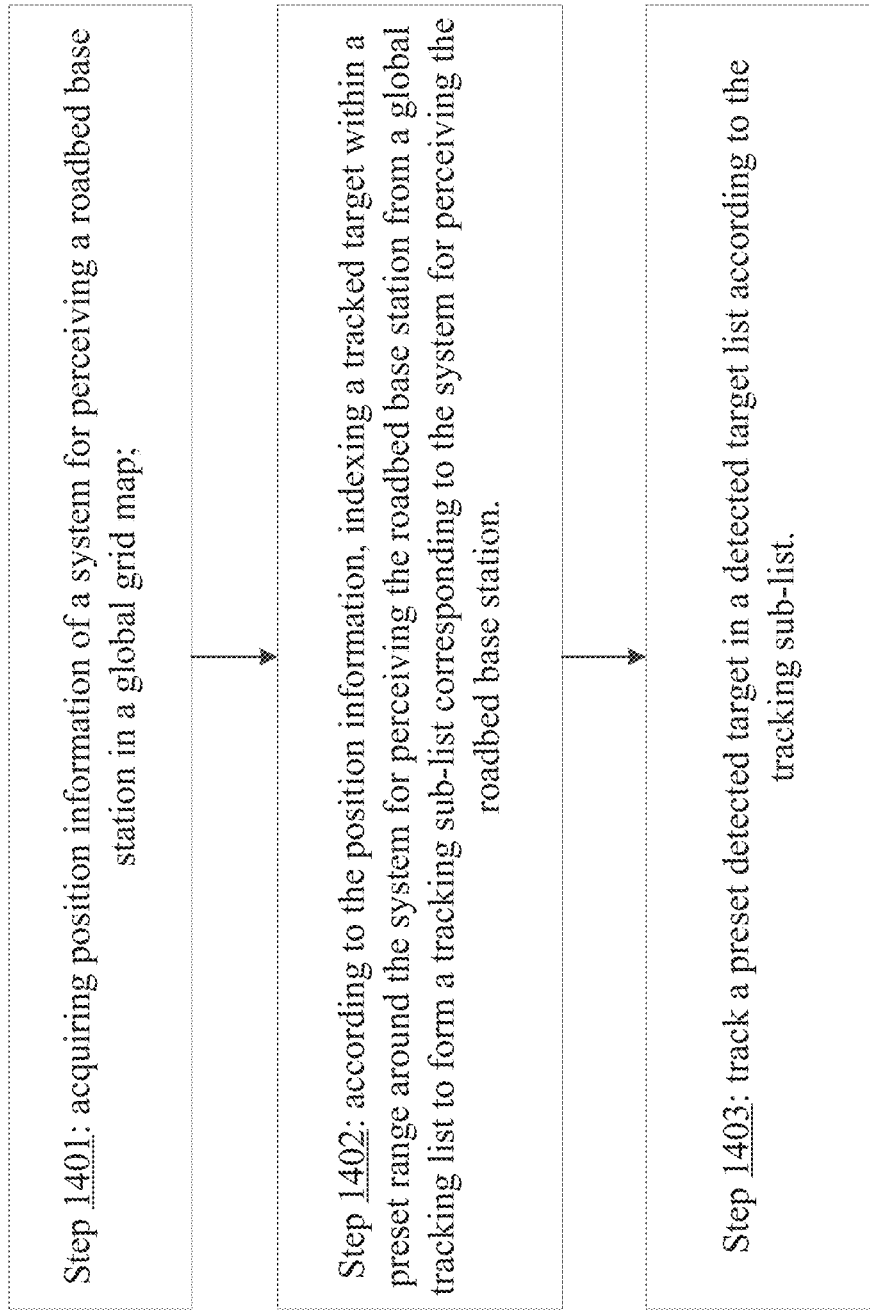
FIG. 6 shows a detailed flowchart of step 140 in FIG. 4.

When the preset detected target is tracked, a local indexing method can be used for tracking. In some embodiments, as shown in FIG. 6, step 140 further includes:

Step 1401: acquiring position information of the system for perceiving the roadbed base station in the global grid map;

Step 1402: according to the position information, indexing the tracked target within the preset range around the system for perceiving the roadbed base station from the global tracking list to form a tracking sub-list corresponding to the system for perceiving the roadbed base station.

Due to a large range of the grid map formed by the plurality of roadbed base stations, many target objects are provided in this range. To save calculating resources, the tracked targets within the perceived range of the system can be indexed from the global tracking list according to the position of the system for perceiving the roadbed base station in the detected target list transmitted by the system for perceiving the roadbed base station to form the tracking sub-list, and track the detected targets in the transmitted detected target list with the tracking sub-list.

Step 1403: tracking the preset detected target in the detected target list transmitted by the system for perceiving the roadbed base station according to the tracking sub-list.

Figure 7:
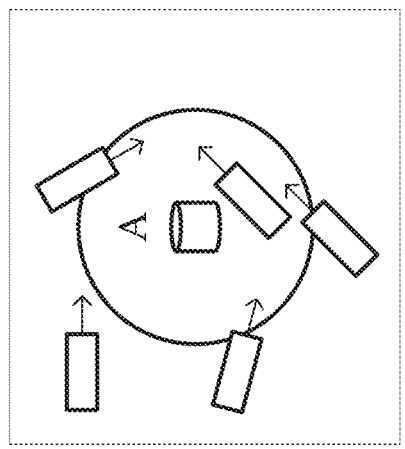
FIG. 7 shows a schematic diagram of partial indexing according to an embodiment of the present disclosure.
Figure 7:
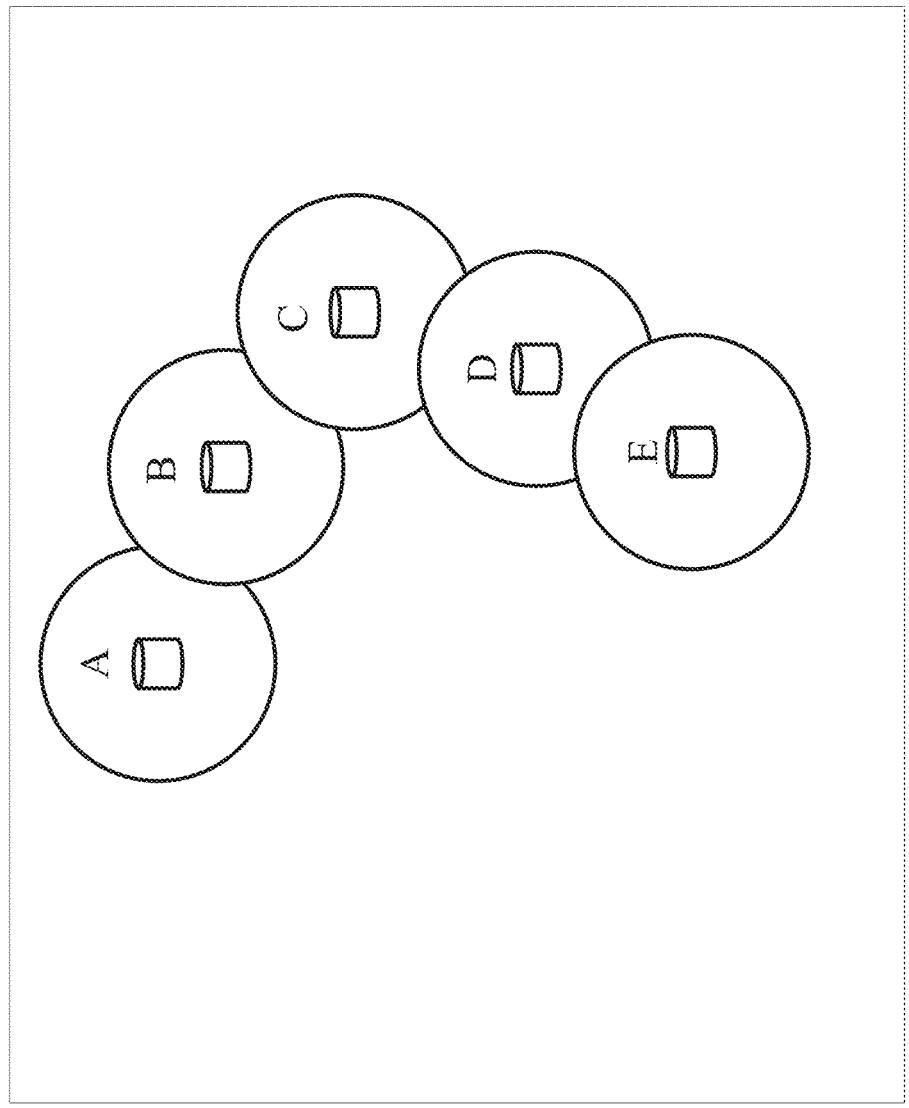

For example, after the detected target list of the roadbed base station A is transmitted to the terminal, the terminal indexes the tracked targets of the roadbed base station A within the preset range in the global grid map from the global tracking list, as shown in FIG. 7. The preset range can exceed the perceived range of the roadbed base station A. Then the indexed tracked target is combined with the preset detected target in the detected target list transmitted to the terminal for tracking. With this local indexing method, calculating cost of the terminal can be greatly saved.

In some embodiments, when tracking the preset detected target in the detected target list transmitted by the system for perceiving the roadbed base station according to the global tracking list, step 140 includes the following steps:

Step a1: associating the preset detected target in the detected target list with the tracked target in the tracking sub-list:

An associating method can be for example as follows: acquiring the label information of the preset detected target, and calculating the degree of the association between the preset detected target and the tracked target in the tracking sub-list according to the part of the label information or all of the label information. The method is the same as the method for acquiring the degree of the association of the preset detected targets in the overlapped areas in step 130, which is not repeated again.

In other embodiments, with other commonly used associating algorithms, such as a Graph Neural Network (GNN) algorithm, the preset detected target is also associated with a tracked target in the tracking sub-list.

Step a2: if the preset detected target can be associated with the tracked target in the tracking sub-list, acquiring a timestamp of the preset detected target; if the timestamp of the preset detected target is earlier than a timestamp of the tracked target associated with the preset detected target, discarding to save the information of the preset detected target, and continuing to reserve the information of the tracked target associated with the preset detected target in the tracking sub-list, if the timestamp of the detected target is later than the timestamp of the tracked target associated with the preset detected target, updating information of the tracked target associated with the preset detected target in the tracking sub-list according to the information of the preset detected target.

In this step, the timestamp of the preset detected target and the timestamp of the tracked target that can be associated are compared and determined. If the timestamp of the preset detected target is earlier than the timestamp of the tracked target, it means that the state of the tracked target in the global tracking list is newer than that of the preset tracked target. In this case, the preset detected target can be discarded and the tracked target can be reserved. On the contrary, it means that the state of the tracked target in the global tracking list is older than that of the preset detected target, and the state of the tracked target can be updated with the preset detected target in the following steps.

Step a3: updating the global tracking list according to the updated tracking sub-list.

After the tracking, the results of the tracked target are saved in the global tracking list. The system for perceiving the roadbed base station is waited to transmit new data, and then the tracked target is updated. One or more of the position information, orientation information, shape information, and the speed information of the tracked target are updated.

In the above step a1, the association can be made in the following manners:

Step a11: acquiring first information of the tracked target in the tracking sub-list; where the first information of the tracked target includes one of the speed information, the position information, category information, the shape information, the orientation information, color information, and semantic information or a combination of at least two of the speed information, the position information, the category information, the shape information, the orientation information, the color information, and semantic information. Step a12: acquiring the timestamp of the detected target list, and predicting second information of each tracked target corresponding to the timestamp of the detected target list according to the first information of each tracked target in the tracking sub-list; where the second information includes one or a combination of the speed information, the position information, the category information, the shape information, the orientation information, the color information, and the semantic information of each tracked target.

The speed information in step a11 and step a12 includes one of the angular speed information, the linear speed information, the angular acceleration information, and the linear acceleration information or a combination of at least two of the angular speed information, the linear speed information, the angular acceleration information, and the linear acceleration information.

Step a13: determining the preset detected target associated with each tracked target according to the second information of each tracked target.

The embodiment of the present disclosure first acquires a current posture of the tracked target in the tracking sub-list, and then predicts the posture (hereinafter referred to as a predicted posture) of the tracked target when a new detected target list is uploaded, thereby searching and tracking the preset detected target associated with the tracked target in the newly uploaded detected target list, that is, the preset detected target whose posture in the newly uploaded detected target list matches the forgoing predicted posture of the tracked target.

It can be understood that the determination of the preset detected target associated with the tracked target in the tracking sub-list can be achieved by determining whether a value of each information of the preset detected targets is the same as a value of each information of the second information corresponding to the tracked targets and determining whether a difference of the two values is within a preset range. Since the second information of the tracked target in step a12 is the information predicted from first information of the tracked target and the timestamp of the detected target list instead of actual measured information, accuracy of the second information cannot be fully ensured. Therefore, when the difference between the value of each information of the present detected target and the value of each information in the second information is within the preset range, the preset detected target is determined to be associated with the tracked target, thereby avoiding a problem that the preset detected target is not matched, which may be resulted from association made only by the same value if an error between predicted information and actual information is provided.

In addition, in some embodiments, when determining the preset detected target associated with each tracked target in step a13, all of the detected targets whose position information difference value with the tracked target in the second information is within a preset range is determined first from the detected target list according to the position information in the second information of the tracked target. The detected target that best matches the tracked target is searched from all of the determined detected targets. In this way, the problem that the preset detected target is not matched, which may be resulted from the association made only by the same value if an error between predicted information and actual information is provided, can be avoided. In some embodiments, when matching the preset detected target in step a13, the preset detected target where the position information of the preset detected target in the detected target list is consistent or substantially consistent with the position information in the second information of the tracked target (for example, the difference value of the two position information is within the preset range) can be determined first. In some embodiments, an association rule is determined according to the number of the preset detected targets where the difference value between the position information of the preset detected target in the detected target list and the position information in the second information of the tracked target is within the preset range.

For Example:

If the number of the preset detected targets where the difference value of the determined position information is within the preset range is not more than two, part of the information in the first information is selected to match the information of the target in the second information. For example, when the number of the preset detected targets where the difference value of the determined position information is within the preset range is one, one of the shape information, the color information, and the semantic information or a combination of at least two of the shape information, the color information, and the semantic information can be preferentially selected for matching. When the similarity reaches the preset value, it is considered that the tracked target matches the preset detected target successfully. Alternatively, whether the similarity value with the lowest matching similarity of the shape information, the color information, and the semantic information is greater than a preset threshold can also be selected to determine the degree of the association.

If more than two preset detected targets are determined, all of the label information of the preset detected targets needs to be compared. For example, a degree of matching various information of the preset detected target in the detected target list with the second information of the tracked target is calculated. Based on this, the preset detected target with the highest matching degree value is determined as the preset detected target associated with the tracked target. When calculating the association degree, weights can be set for the position (the distance between the preset detected target and the tracked target), orientation, speed, and point cloud distribution, and the matching degree can be calculated by combining the weights.

The preset detected target associated with the tracked target in the tracking sub-list is first filtered according to the position information. According to the number of preset detected targets that meet position limitation requirements, the association degree rule of the preset detected target and the tracked target is selected and calculated. With the forgoing method, the calculating rule of the matching degree of a relation between the preset detected target and the tracked target can be flexibly set while satisfying tracking accuracy, thereby reducing calculating amount of the terminal while meeting tracking requirements.

Step a14: associating the tracked target with the preset detected target.

In some embodiments, if the tracked target associated with a certain preset detected target is not found in the global tracking list, the preset detected target is added to the global tracking list as a new tracked target. Therefore, after performing step a14, the method further includes:

Step a15: determining whether the preset detected target that is not associated with the tracked target in the tracking sub-list in the preset detected target is provided.

Step a16: if the preset detected target that is not associated with the tracked target is provided, adding to the tracking sub-list the information of the preset detected target that is not associated with the tracked target, generating a new tracked target, and updating the tracked target information in the tracking sub-list; and Step a17: updating the global tracking list according to the updated tracking sub-list.

The embodiment of the present disclosure constructs the global grid map of the roadbed network to receive the detected target list transmitted by the system for perceiving at least two roadbed base stations, index the transmitted detected target list into the global grid map, generate a global tracking list, track the preset detected targets in the detected target list transmitted by the system for perceiving the roadbed base station according to the global tracking list, and realize the global tracking of the target.

Figure 8:
FIG. 8 shows a block diagram of a device for perceiving a multi-site roadbed network according to an embodiment of the present disclosure.
Figure 9:
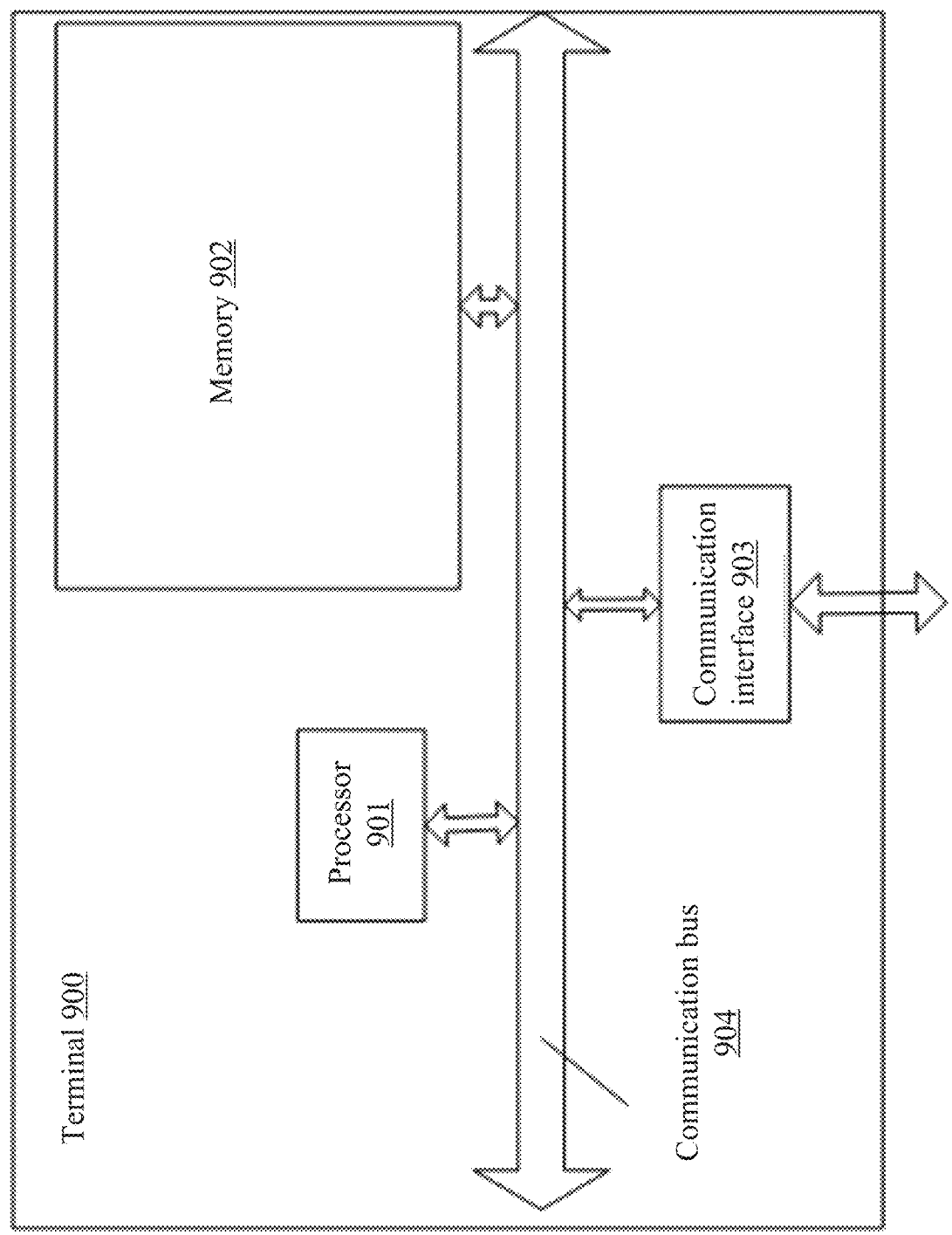
FIG. 9 shows a block diagram of the terminal according to an embodiment of the present disclosure.

An embodiment of the present disclosure also provides a device 800 for perceiving a multi-site roadbed network, which is applied to the forgoing terminal. As shown in FIG. 8, the device 800 can include:

a map constructing module 801, configured to construct a global grid map of the roadbed network, where the global grid map is marked with a position of a system for perceiving at least two roadbed base stations and a perceived range of the system;

a target list receiving module 802, configured to receive a detected target list transmitted by each of the systems for perceiving at least two roadbed base stations, where the detected target list is a set of preset detected targets;

a tracking list forming module 803, configured to index into the global grid map the detected target list transmitted by each system for perceiving the roadbed base station according to the position of each system for perceiving the roadbed base station to generate a global tracking list; and a tracking module 804, configured to track the preset detected target in the detected target list transmitted by the system for perceiving the roadbed base station according to the global tracking list.

In some embodiments, the tracking module 804 is also configured to:

acquiring position information of the system for perceiving the roadbed base station in the global grid map;

according to the position information, indexing a tracked target within a preset range around the system for perceiving the roadbed base station from the global tracking list to form a tracking sub-list corresponding to the system for perceiving the roadbed base station; and tracking the preset detected target in the detected target list according to the tracking sub-list.

In some embodiments, the tracking module 804 is also configured to:

associating the preset detected target in the detected target list with the tracked target in the tracking sub-list;

if the preset detected target can be associated with the tracked target in the tracking sub-list, acquiring a timestamp of the preset detected target; if the timestamp of the preset detected target is earlier than that of the tracked target associated with the preset detected target, discarding to save information of the preset detected target, and continuing to reserve the tracked target information associated with the tracking sub-list in the tracking sub-list; and if the timestamp of the detected target is later than the timestamp of the tracked target associated with the detected target, updating the information of the tracked target associated with the preset detected target in the tracking sub-list according to the information of the preset detected target; and The global tracking list is updated according to the updated tracking sub-list.

In some embodiments, the tracking module 804 is also configured to:

acquiring first information of the tracked target in the tracking sub-list; where the first information of the tracked target includes one of the position information, orientation information, and speed information or a combination of at least two of the position information, orientation information, and speed information;

acquiring the timestamp of the detected target list, and predicting second information of each tracked target corresponding to the timestamp of the detected target list according to the first information of each tracked target in the tracking sub-list; where the second information includes one of the position information, orientation information, and speed information or a combination of at least two of the position information, orientation information, and speed information;

determining the preset detected target matching each tracked target according to the second information of each tracked target; and associating the tracked target with the preset detected target matching the tracked target.

In some embodiments, the tracking module 804 is also configured to:

determining whether the preset detected target that is not associated with the tracked target in the tracking sub-list in the preset detected target is provided;

if the preset detected target that is not associated with the tracked target is provided, adding to the tracking sub-list the information of the preset detected target that is not associated with the tracked target, generating a new tracked target, and updating the tracked target information in the tracking sub-list; and updating the global tracking list according to the updated tracking sub-list.

It should be noted that if the device for perceiving the multi-site roadbed network provided by the embodiment of the present disclosure is a device that can execute the forgoing method for perceiving the multi-site roadbed network, all embodiments of the forgoing method for perceiving the multi-site roadbed network are applicable to the device, and can achieve the same or similar beneficial effects.

The embodiment of the present disclosure constructs the global grid map of the roadbed network to receive the detected target list transmitted by the system for perceiving at least two roadbed base stations, index the transmitted detected target list into the global grid map, generate a global tracking list, track the preset detected targets in the detected target list transmitted by the system for perceiving the roadbed base station according to the global tracking list, and realize the global tracking of the target.

An embodiment of the present disclosure further provides a terminal 900, including: a processor 901, a memory 902, a communication interface 903, and a communication bus 904, where the processor 901, the memory 902, and the communication interface 903 complete intercommunication via the communication bus 904. The memory 902 is configured to store at least one executable instruction. The executable instruction causes the processor 901 to perform the steps of the embodiment of the forgoing method for perceiving the multi-site road-based network.

It should be noted that if the terminal provided by the embodiment of the present disclosure is a terminal that can execute the forgoing method for perceiving the multi-site roadbed network, all embodiments of the forgoing method for perceiving the multi-site roadbed network are applicable to the terminal, and can achieve the same or similar beneficial effects.

The embodiment of the present disclosure constructs the global grid map of the roadbed network to receive the detected target list transmitted by the system for perceiving at least two roadbed base stations, index the transmitted detected target list into the global grid map, generate a global tracking list, track the preset detected targets in the detected target list transmitted by the system for perceiving the roadbed base station according to the global tracking list, and realize the global tracking of the target.

An embodiment of the present disclosure also provides a non-volatile computer readable storage medium. At least one executable instruction is stored in the storage medium. The executable instruction causes the processor to perform the steps of the embodiment of the forgoing method for perceiving the multi-site roadbed network.

The embodiment of the present disclosure also provides a computer program product, including a computer program stored on a computer storage medium. The computer program includes program instructions. When the program instructions are executed by a computer, the computer program executes the forgoing method for perceiving the multi-site roadbed network in any of the foregoing method embodiments.

The algorithms or displays provided here are not inherently related to any particular computer, virtual system, or other equipment. Various general-purpose systems can also be used with the teaching based on this. Based on the forgoing description, the structure required to construct this type of system is obvious. In addition, the embodiments of the present disclosure are not directed to any specific programming language. It should be understood that various programming languages can be used to implement the content of the present disclosure described herein, and the forgoing description of a specific language is for the objective of disclosing the best embodiment of the present disclosure.

What is claimed is:

1. A method for perceiving a multi-site roadbed network comprising a system for perceiving at least two roadbed base stations and a terminal, the method comprising:
constructing, by the terminal, a global grid map of the multi-site roadbed network, wherein the global grid map is marked with positions of subsystems of the system for perceiving the at least two roadbed base stations and a perceived range of each subsystem of the system;
receiving, by the terminal, a detected target list transmitted by each subsystem of the system for perceiving a corresponding roadbed base station of the at least two roadbed base stations, wherein the detected target list comprises a set of preset detected targets;
indexing, by the terminal, into the global grid map the detected target list transmitted by each subsystem for perceiving the corresponding roadbed base station according to the position of each subsystem to generate a global tracking list; and
tracking, by the terminal, the preset detected target in the detected target list transmitted by each subsystem according to the global tracking list,
wherein tracking the preset detected target in the detected target list transmitted by each subsystem according to the global tracking list comprises:
acquiring position information of the subsystem for perceiving the corresponding roadbed base station in the global grid map;
after the detected target list is received by the terminal, according to the position information, indexing a tracked target within a preset range around the subsystem from the global tracking list to form a tracking sub-list corresponding to the subsystem, wherein:
the preset range around the subsystem exceeds the perceived range of the subsystem; and
the tracking sub-list comprises the tracked target as indexed, from the global tracking list, within the preset range of the subsystem; and
tracking the preset detected target in the detected target list according to the tracking sub-list,
wherein tracking the preset detected target in the detected target list according to the tracking sub-list comprises:
associating the preset detected target in the detected target list with the tracked target in the tracking sub-list, comprising predicting second information of each tracked target, corresponding to a timestamp of the detected target list, according to first information of each tracked target in the tracking sub-list, and determining whether the preset detected target matches each tracked target according to the second information;
updating the first information of the tracked target associated with the preset detected target in the tracking sub-list according to information of the preset detected target to form an updated tracking sub-list; and
updating the global tracking list according to the updated tracking sub-list;
wherein tracking the preset detected target in the detected target list according to the tracking sub-list further comprises:
associating the preset detected target in the detected target list with the tracked target in the tracking sub-list;
if the preset detected target is associated with the tracked target in the tracking sub-list, acquiring the timestamp of the preset detected target; if the timestamp of the preset detected target is earlier than a timestamp of the tracked target associated with the preset detected target, discarding to save the information of the preset detected target, and continuing to reserve tracked target information associated with the tracking sub-list in the tracking sub-list; and if the timestamp of the preset detected target is later than the timestamp of the tracked target associated with the preset detected target, updating the first information of the tracked target associated with the preset detected target in the tracking sub-list according to the information of the preset detected target; and
updating the global tracking list according to the updated tracking sub-list,
wherein associating the preset detected target in the detected target list with the tracked target in the tracking sub-list further comprises:
acquiring the first information of the tracked target in the tracking sub-list, wherein the first information of the tracked target comprises the position information, orientation information, and speed information;
acquiring the timestamp of the detected target list, and predicting the second information of each tracked target corresponding to the timestamp of the detected target list according to the first information of each tracked target in the tracking sub-list, wherein the second information comprises one or a combination at least one of the position information, the orientation information, or the speed information of each tracked target;
determining the preset detected target matching each tracked target according to the second information of each tracked target; and
associating the tracked target with the preset detected target matching the tracked target.

2. The method according to claim 1, wherein after associating the tracked target with the preset detected target matching the tracked target, the method further comprises:
determining whether the preset detected target that is not associated with the tracked target in the tracking sub-list in the preset detected target is provided;
if the preset detected target that is not associated with the tracked target is provided, adding to the tracking sub-list the information of the preset detected target that is not associated with the tracked target, generating a new tracked target, and updating the first information of the tracked target in the tracking sub-list; and updating the global tracking list according to the updated tracking sub-list.

3. A device for perceiving a multi-site roadbed network, comprising a terminal that comprises a processor, wherein the processor is configured to:

construct a global grid map of the multi-site roadbed network, wherein the global grid map is marked with positions of subsystems of a system for perceiving at least two roadbed base stations and a perceived range of each subsystem of the system;

receive a detected target list transmitted by each subsystem of the system for perceiving a corresponding roadbed base station of the at least two roadbed base stations, wherein the detected target list comprises a set of preset detected targets;

index into the global grid map the detected target list transmitted by each subsystem for perceiving the corresponding roadbed base station according to the position of each subsystem to generate a global tracking list;

track the preset detected target in the detected target list transmitted by each subsystem according to the global tracking list;

acquire position information of the subsystem for perceiving the corresponding roadbed base station in the global grid map;

after receiving the detected target list, according to the position information, index a tracked target within a preset range around the subsystem from the global tracking list to form a tracking sub-list corresponding to the subsystem, wherein:
the preset range around the subsystem exceeds the perceived range of the subsystem; and
the tracking sub-list comprises the tracked target as indexed, from the global tracking list, within the preset range of the subsystem;

track the preset detected target in the detected target list according to the tracking sub-list;

associate the preset detected target in the detected target list with the tracked target in the tracking sub-list, comprising predicting second information of each tracked target, corresponding to a timestamp of the detected target list, according to first information of each tracked target in the tracking sub-list, and determining whether the preset detected target matches each tracked target according to the second information;

update the first information of the tracked target associated with the preset detected target in the tracking sub-list according to information of the preset detected target to form an updated tracking sub-list; and update the global tracking list according to the updated tracking sub-list, wherein tracking the preset detected target in the detected target list according to the tracking sub-list further comprises:
associating the preset detected target in the detected target list with the tracked target in the tracking sub-list;
if the preset detected target is associated with the tracked target in the tracking sub-list, acquiring the timestamp of the preset detected target; if the timestamp of the preset detected target is earlier than a timestamp of the tracked target associated with the preset detected target, discarding to save the information of the preset detected target, and continuing to reserve tracked target information associated with the tracking sub-list in the tracking sub-list; and if the timestamp of the preset detected target is later than the timestamp of the tracked target associated with the preset detected target, updating the first information of the tracked target associated with the preset detected target in the tracking sub-list according to the information of the preset detected target; and updating the global tracking list according to the updated tracking sub-list, wherein associating the preset detected target in the detected target list with the tracked target in the tracking sub-list further comprises:
acquiring the first information of the tracked target in the tracking sub-list, wherein the first information of the tracked target comprises the position information, orientation information, and speed information;
acquiring the timestamp of the detected target list, and predicting the second information of each tracked target corresponding to the timestamp of the detected target list according to the first information of each tracked target in the tracking sub-list, wherein the second information comprises one or a combination at least one of the position information, the orientation information, or the speed information of each tracked target;
determining the preset detected target matching each tracked target according to the second information of each tracked target; and
associating the tracked target with the preset detected target matching the tracked target.

4. A terminal, comprising a processor, a memory, a communication interface, and a communication bus, wherein the processor, the memory, and the communication interface complete intercommunication via the communication bus; and wherein the memory is configured to store at least one executable instruction, and the executable instruction, when being executed by the processor, causes the processor to perform the steps of the forgoing method for perceiving the multi-site roadbed network according to claim 1.

5. A system for perceiving a multi-site roadbed network, comprising a system for perceiving at least two roadbed base stations and a terminal, wherein:

the system that comprises subsystems for perceiving the at least two roadbed base stations is configured to acquire data, detect a target based on the acquired data, obtain a detected target list, and transmit the detected target list to the terminal, wherein the detected target list comprises a set of preset detected targets;

the terminal is configured to: construct a global grid map of the multi-site roadbed network, wherein the global grid map is marked with positions of the subsystems of the system for perceiving the at least two roadbed base stations and a perceived range of each subsystem of the system; receive the detected target list transmitted by each subsystem of the system for perceiving a corresponding roadbed base station of the at least two roadbed base stations, wherein the detected target list comprises the set of the preset detected targets; according to the position of each subsystem for perceiving the corresponding roadbed base station, index into the global grid map the detected target list transmitted by each subsystem to generate a global tracking list; and track the preset detected target in the detected target list transmitted by each subsystem according to the global tracking list, wherein tracking the preset detected target in the detected target list transmitted by each subsystem according to the global tracking list comprises:
- acquiring position information of the subsystem for perceiving the corresponding roadbed base station in the global grid map;
- after the detected target list is received by the terminal, according to the position information, indexing a tracked target within a preset range around the subsystem from the global tracking list to form a tracking sub-list corresponding to the subsystem, wherein:
  - the preset range around the subsystem exceeds the perceived range of the subsystem; and
  - the tracking sub-list comprises the tracked target as indexed, from the global tracking list, within the preset range of the subsystem; and
- tracking the preset detected target in the detected target list according to the tracking sub-list, wherein tracking the preset detected target in the detected target list according to the tracking sub-list further comprises:
- associating the preset detected target in the detected target list with the tracked target in the tracking sub-list, comprising predicting second information of each tracked target, corresponding to a timestamp of the detected target list, according to first information of each tracked target in the tracking sub-list, and determining whether the preset detected target matches each tracked target according to the second information;
- updating the first information of the tracked target associated with the preset detected target in the tracking sub-list according to information of the preset detected target to form an updated tracking sub-list; and
- updating the global tracking list according to the updated tracking sub-list;

wherein tracking the preset detected target in the detected target list according to the tracking sub-list further comprises:
- associating the preset detected target in the detected target list with the tracked target in the tracking sub-list;
- if the preset detected target is associated with the tracked target in the tracking sub-list, acquiring the timestamp of the preset detected target; if the timestamp of the preset detected target is earlier than a timestamp of the tracked target associated with the preset detected target, discarding to save the information of the preset detected target, and continuing to reserve tracked target information associated with the tracking sub-list in the tracking sub-list; and if the timestamp of the preset detected target is later than the timestamp of the tracked target associated with the preset detected target, updating the first information of the tracked target associated with the preset detected target in the tracking sub-list according to the information of the preset detected target; and
- updating the global tracking list according to the updated tracking sub-list, wherein associating the preset detected target in the detected target list with the tracked target in the tracking sub-list further comprises:
- acquiring the first information of the tracked target in the tracking sub-list, wherein the first information of the tracked target comprises the position information, orientation information, and speed information;
- acquiring the timestamp of the detected target list, and predicting the second information of each tracked target corresponding to the timestamp of the detected target list according to the first information of each tracked target in the tracking sub-list, wherein the second information comprises one or a combination at least one of the position information, the orientation information, or the speed information of each tracked target;
- determining the preset detected target matching each tracked target according to the second information of each tracked target; and
- associating the tracked target with the preset detected target matching the tracked target.

6. The system according to claim 5, wherein the system for perceiving the at least two roadbed base stations, the system comprising the subsystem for perceiving a corresponding roadbed base station of the at least two roadbed base stations, and the subsystem comprising a sensor and a processor, wherein
- the sensor is configured to acquire the data and comprises an image sensor, a radar sensor, or a combination of the image sensor and the radar sensor; and
- the processor is configured to detect the target according to the data acquired by the sensor, and store a label of the preset detected target.

7. The system according to claim 5, wherein the terminal comprises a storage unit and a calculating unit, wherein
- the calculating unit is configured to: construct the global grid map of the multi-site roadbed network; according to a position of a roadbed base station of the at least two roadbed base stations and a position of the preset detected target, index the detected target list transmitted by the roadbed base station to the global grid map to form a global tracking list containing a plurality of tracked targets; and according to the global tracking list, track the preset detected targets in the detected target list transmitted by the roadbed base station; and
- the storage unit is configured to store the global grid map and the global tracking list.

* * * * *